United States Patent [19]

Ward, III

[11] 4,147,754
[45] Apr. 3, 1979

[54] SYSTEM FOR SELECTIVE REMOVAL OF HYDROGEN SULFIDE FROM A MIXTURE OF GASES

[75] Inventor: William J. Ward, III, Schenectady, N.Y.

[73] Assignee: General Electric Company, Schenectady, N.Y.

[21] Appl. No.: 817,327

[22] Filed: Jul. 20, 1977

Related U.S. Application Data

[62] Division of Ser. No. 599,872, Jul. 28, 1975, abandoned.

[51] Int. Cl.² .............................................. B01D 53/34
[52] U.S. Cl. .................................... 423/224; 423/226; 423/229; 423/232; 423/573 G; 55/16
[58] Field of Search ............... 423/210, 220, 232, 224, 423/573, 228, 229, 226; 55/16

[56] References Cited

U.S. PATENT DOCUMENTS

| | | | |
|---|---|---|---|
| 3,244,763 | 4/1966 | Cohn | 260/677 |
| 3,396,510 | 8/1968 | Ward et al. | 55/16 |
| 3,624,983 | 12/1971 | Ward | 55/16 |
| 3,819,806 | 6/1974 | Ward et al. | 423/220 |
| 3,926,561 | 12/1975 | Lucero | 23/232 R |

*Primary Examiner*—Earl C. Thomas
*Attorney, Agent, or Firm*—Nathan D. Herkamp; Joseph T. Cohen; Leo I. MaLossi

[57] ABSTRACT

Hydrogen sulfide is removed from a mixture of gases including carbon dioxide by passing the mixture over an immobilized liquid membrane in intimate contact with a hydrophobic, microporous gas, permeable barrier and absorbing in a liquid solution hydrogen sulfide passing through the membrane. In a sweep of hot carbonate solution, a nearly stagnant boundary layer adjacent the gas permeable barrier absorbs acid gases by reaction and diffusion, maintaining low hydrogen sulfide partial pressure at the outlet side of the barrier. Alternatively, the sweep may comprise an aqueous solution containing a redox agent which converts absorbed hydrogen sulfide into sulfur, or an ethanol amine solution. The apparatus exhibits low permeability to carbon dioxide and high permeability to hydrogen sulfide.

3 Claims, 6 Drawing Figures

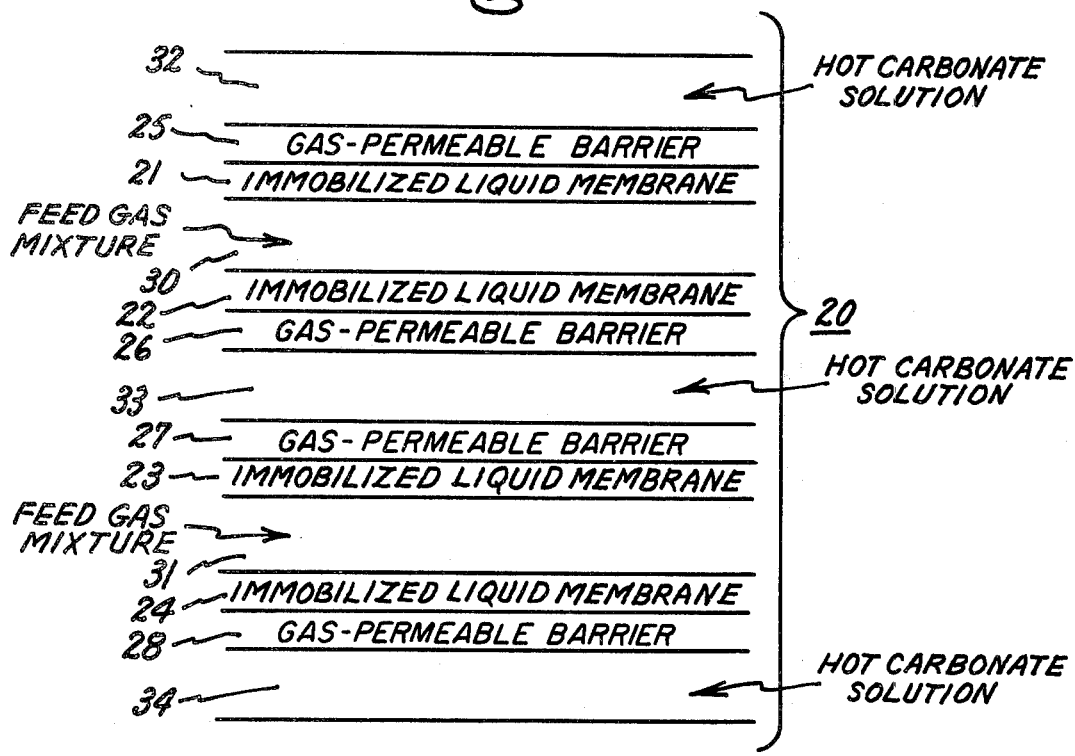
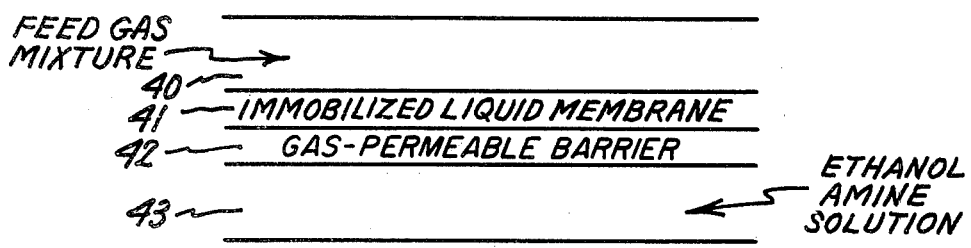
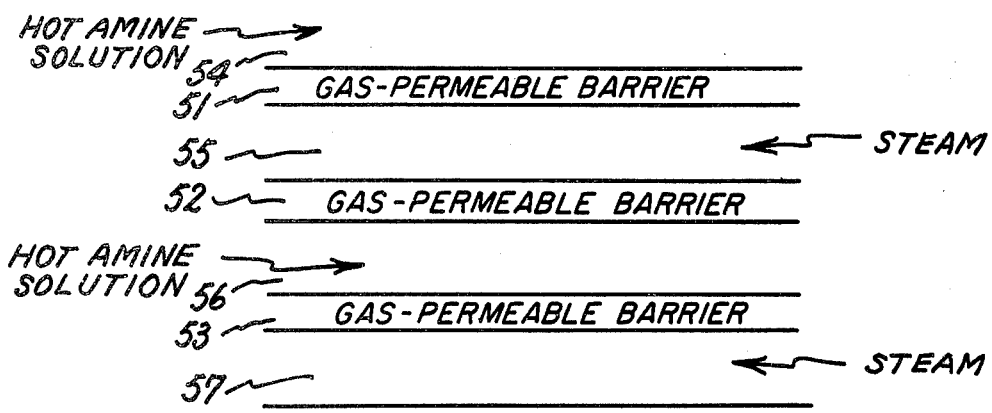

SYSTEM FOR SELECTIVE REMOVAL OF HYDROGEN SULFIDE FROM A MIXTURE OF GASES

This is a division, of application Ser. No. 599,872, filed July 28, 1975, and now abandoned.

INTRODUCTION

This invention relates to removal of hydrogen sulfide from a mixture of gases including carbon dioxide, such as gasified coal, and more particularly to employing a liquid solution to absorb hydrogen sulfide separated from a mixture of such gases by use of immobilized liquid membranes.

Prevention of air pollution necessitates removal of hydrogen sulfide from coal gas utilized in a combustion process in order to minimize release of sulfur dioxide into the atmosphere. In Ward application Ser. No. 599,871 filed concurrently herewith and assigned to the instant assignee, a method and apparatus for removing hydrogen sulfide from a mixture of gases including carbon dioxide, such as coal gas, is described and claimed. The sour off-gas from such hydrogen sulfide recovery process is normally sent to a Claus plant for conversion to sulfur. If the Claus plant could be eliminated from the overall process, a major cost reduction would be achieved.

The present invention concerns use of a liquid solution, herein designated a sweep liquid, to maintain low partial pressure of hydrogen sulfide at the outlet or low pressure side of a gas permeable barrier supporting, and in intimate contact with, an immobilized liquid membrane. This provides a hydrogen sulfide partial pressure gradient across the immobilized liquid membrane. The low partial pressure at the outlet side of the gas permeable barrier is produced, at least in part, as the result of a reaction between the sweep liquid and the hydrogen sulfide emerging from the barrier. Discrimination against carbon dioxide passage into the sweep liquid is provided by the immobilized liquid membrane since carbon dioxide transport through the membrane is reaction rate limited while hydrogen sulfide transport therethrough is diffusion limited, as indicated in Ward et al. U.S. Pat. No. 3,819,806, issued June 25, 1974 and assigned to the instant assignee, the description thereof being incorporated herein by reference.

One immobilized liquid membrane assembly useful for the foregoing purpose is comprised of carbonate/bicarbonate solution, in the range of 1-5 mils thick. The membrane is separated from the sweeping solution by a gas permeable barrier or gas gap comprising a microporous, hydrophobic material exhibiting very high permeability to gases relative to that of the membrane. The assembly thus produced can be built up into a repeating plurality of layers. If desired, an alternative immobilized liquid membrane assembly of the type described and claimed in the aforementioned Ward application Ser. No. 599,871, may be employed. The sweep liquid can be circulated at feed gas pressure so that membrane support is relatively simple and inexpensive, and defects in the membrane are tolerable.

Accordingly, one object of the invention is to provide a simplified method and apparatus for efficiently transferring hydrogen sulfide out of a mixture of gases including carbon dioxide, such as gasified coal.

Another object is to provide a method and apparatus for removing hydrogen sulfide from a mixture of gases by absorbing the hydrogen sulfide in a sweep liquid.

Briefly, in accordance with one aspect of the invention, a method of removing hydrogen sulfide from a mixture of gases including carbon dioxide comprises contacting an immobilized liquid membrane of $CO_3^=/HCO_3^-$ solution with the mixture to allow facilitated transport of hydrogen sulfide through the membrane to a porous gas permeable barrier, passing gases emerging from the membrane through the gas permeable barrier, and absorbing in a liquid sweep the gases emerging from the gas permeable barrier. Partial pressure of hydrogen sulfide at the low pressure side of the gas permeable barrier is thus maintained at a low level.

In accordance with another aspect of the invention, apparatus for removing hydrogen sulfide from a mixture of gases including carbon dioxide comprises an immobilized liquid membrane which is reversibly chemically reactive with hydrogen sulfide, and a gas permeable barrier comprised of a hydrophobic, porous material situated in intimate contact with the immobilized liquid membrane. Means are provided for conducting flow of a mixture of gases along a surface of the immobilized liquid membrane, and means are provided for conducting flow of a sweep liquid along the surface of the gas permeable barrier, the liquid absorbing gases emerging from the barrier.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 4 is a schematic diagram of another embodiment of the invention;

FIG. 5 is a schematic diagram of yet another embodiment of the invention; and

FIG. 6 is a schematic diagram of stripping apparatus for removing hydrogen sulfide previously absorbed by the ethanol amine solution employed in the apparatus of FIG. 5.

DETAILED DESCRIPTION

Figure 1:
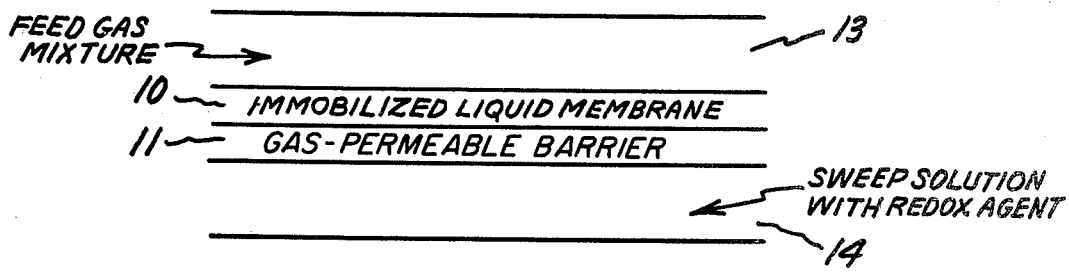
FIG. 1 is a schematic diagram of one embodiment of the invention.

In FIG. 1, an immobilized liquid membrane (ILM) 10 is shown in intimate contact with, and supported by, a gas permeable barrier 11 comprised of a microporous, hydrophobic material such as Teflon, a trademark of E. I. du Pont de Nemours and Company, Wilmington, Del., for fluorinated hydrocarbon polymers, typically of the type designated "GORE-TEX," a trademark of W. L. Gore & Associates, Inc., Newark, Delaware. A continuously-flowing feed gas mixture containing both hydrogen sulfide and carbon dioxide, as typified by gasified coal, is admitted into a flow chamber 13 which conducts the gas mixture along, and thereby brings it into contact with, the outer surface of ILM 10. A continuously-flowing sweep solution is passed through a flow chamber 14 so as to flow along, and thereby contact, the outer surface of barrier 11.

Composition of ILM 10 is described in detail in Ward et al. U.S. Pat. No. 3,396,510, issued Aug. 13, 1968 and in Ward et al. U.S. Pat. No. 3,819,806, issued June 25, 1974, both patents being assigned to the instant assignee and the descriptions therein being incorporated herein by reference. ILMs have previously been utilized for removing $H_2S$ from gas streams, as described and claimed in the latter patent.

In one embodiment, the ILM referred to in Ward et al. U.S. Pat. No. 3,819,806 and employed in the present invention comprises a matrix layer having interconnecting micropores occupied by an aqueous solution. Solutions used to make ILMs of this type have been prepared from distilled water and a mixture of potassium carbonate and potassium bicarbonate, as stated in U.S. Pat. No. 3,819,806. The microporous matrix is made of a hydrophilic material (i.e., wet by the particular solution employed). Commercially available microporous materials useful for this purpose are those sold, for example, under the trademark "Solvinert" by Millipore Corporation, Bedford, Mass., and under the trademark "Acropor" by Gelman Instrument Company, Ann Arbor, Mich.

In the case of the $CO_3^=/HCO_3^-$ system, it is necessary to maintain proper carbon dioxide partial pressure in the feed gas stream in contact with the membrane to prevent substantial depletion of the $HCO_3^-$ ion, which is required to accomplish proton ($H^+$) transfer across the ILM. It was pointed out in U.S. Pat. No. 3,819,806 that in the case of the carbonate/bicarbonate ILM, average distribution of $HCO_3^-$ and $CO_3^=$ will be determined by average partial pressure of $CO_2$ on both sides of the membrane and should be such that concentration of $HCO_3^-$ and $CO_3^=$ will be of the same order of magnitude (e.g., $CO_2$ partial pressure of the order of 0.01 atmospheres at 23° C.). Due to the $H_2S$ pressure difference across the membrane, significant concentration gradients in $HCO_3^-$ and $CO_3^=$ are established in the ILM and are not altered significantly by the presence of $CO_2$ adjacent the membrane because hydrolysis of $CO_2$ is a slow reaction relative to speed of diffusion in the system. The ILM is thus selective to $H_2S$, since facilitated $CO_2$ transport through the ILM is reaction rate limited, even at 100° C., while the facilitated $H_2S$ transport reactions, which are reversible, occur instantaneously so that net $H_2S$ transport is diffusion limited.

An aqeous solution containing a redox agent is supplied to flow manifold 14. $H_2S$ emerging from gas permeable barrier 11 at the low pressure side thereof is absorbed in the solution and converted to sulfur. Thus $H_2S$ partial pressure at the low pressure side of barrier 11 is maintained at a low value. The spent oxidizing agent of the sweep solution is regenerated with air, and sulfur is filtered from the solution which is thereafter returned to the membrane assembly as fresh sweep solution. A major advantage to this approach resides in elimination of need for employing a Claus plant, such as described in R. N. Shreeve, *Chemical Process Industries*, McGraw-Hill, 1967, at page 325, and thus avoiding its attendant cleanup problems. Heretofore, $H_2S$ removed from gaseous mixtures was concentrated prior to being supplied to a Claus plant for conversion to sulfur. The Claus plant conversion constitutes added chemical process equipment, along with its costs of operation and maintenance, in addition to the necessary cleanup process required because of high sulfur emissions from the plant.

The approach exemplified by the apparatus of FIG. 1 has three additional significant advantages. Since $H_2S$ is essentially eliminated at the sweep side of the membrane, the driving force for $H_2S$ transfer out of the feed gas mixtures is substantially increased. If the $H_2S$ partial pressure is effectively zero at all points on the sweep side of the membrane, the necessary membrane area is approximately one-third less for the system as compared to that in a system in which steam is used as a sweep fluid. Moreover, since the sweep liquid can be circulated at feed gas pressure, doing so makes membrane support easier and less expensive, and defects in the membrane can be tolerated. In addition, the membrane serves to protect the redox solution from deleterious substances in the feed gas mixture that would degrade the redox solution, such as HCN which is a coal gas constituent.

The sweep liquid may comprise a $Fe^{+++}$ solution capable of oxidizing $H_2S$ directly to elemental sulfur by the reaction:

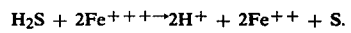

$$H_2S + 2Fe^{+++} \rightarrow 2H^+ + 2Fe^{++} + S.$$

The $Fe^{++}$ can be regenerated back to $Fe^{+++}$ by oxygen obtained from air, according to:

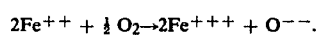

$$2Fe^{++} + \tfrac{1}{2} O_2 \rightarrow 2Fe^{+++} + O^{--}.$$

Thus, when both steps are combined, the net effect is that iron acts as a catalyst for oxidizing $H_2S$ to S by the reaction:

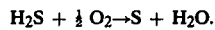

$$H_2S + \tfrac{1}{2} O_2 \rightarrow S + H_2O.$$

To keep the iron in aqueous solution, an organic chelating agent, ethylene diamine tetracetic acid (EDTA) is used. A typical redox solution is:

28 grams KOH
36.5 grams EDTA
183.5 grams EDTA (Fe, Na)
   (ethylenedinitrilo tetracetic acid ferric sodium salt)
106 grams $K_3PO_4$
Water to make 1,000 milliliters.

This solution is 0.5 molar, has a pH of about 10.3, and combines with 0.25 mole of $H_2S$ per liter of solution before needing regeneration.

Figure 2:
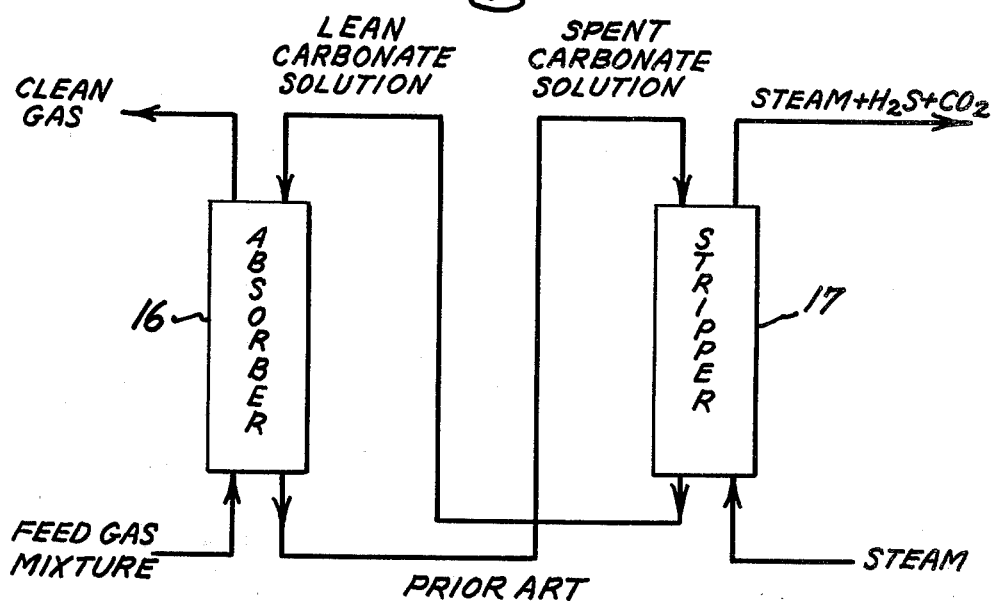
FIG. 2 is a schematic diagram of a conventional hot carbonate process for removal of hydrogen sulfide from high pressure gasified coal.

In FIG. 2, a known hot carbonate process for removal of hydrogen sulfide from gasified coal is illustrated schematically. Hot carbonate solution is supplied to an absorber 16, in which it contacts the feed gas mixture (gasified coal). Most of the $H_2S$ and some $CO_2$ in the gasified coal is absorbed in the carbonate solution, so that essentially clean gas emerges from the absorber. The spent solution is reduced in pressure, and pumped to a stripper 17 through which steam is passed. The steam in the stripper removes $H_2S$ and $CO_2$ from the solution, which is then returned to absorber 16. It is desirable that $H_2S$ in the stripper effluent be as concentrated as possible in order to make the Claus plant less costly and more efficient. Moreover, by reducing removal of $CO_2$ from the coal gas, power cycle efficiency is increased.

Figure 3:
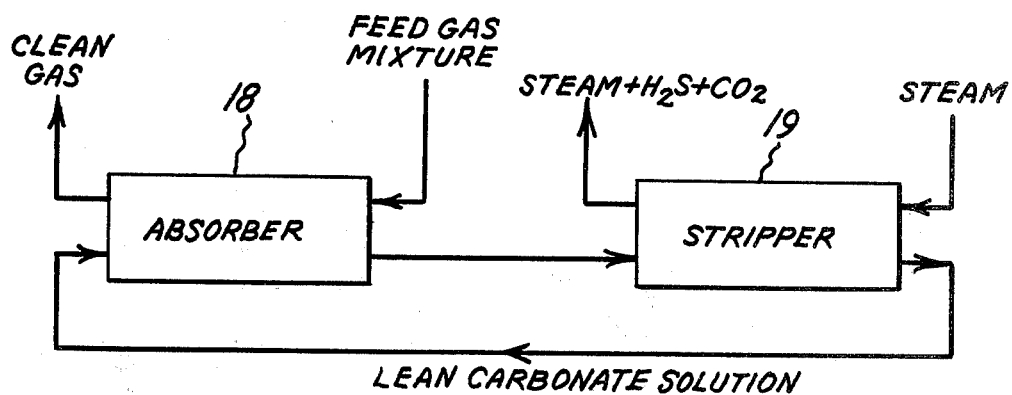
FIG. 3 is a schematic diagram of a hot carbonate process operated according to the present invention in a way that is more compact and more selective in hydrogen sulfide removal than the conventional hot carbonate process.

FIG. 3 schematically illustrates a new way of operating what is essentially a hot carbonate process, in a manner that is more compact, and removes $H_2S$ more selectively, than the system illustrated in FIG. 2 Absorber 18 comprises a membrane assembly wherein a series of flat sheets is stacked one on top of the other. A feed gas mixture including $CO_2$ and $H_2S$, supplied at a pressure of 300 p.s.i., passes through alternate layers of the assembly. Hot carbonate solution flows through the remaining alternate layers and absorbs $H_2S$ and $CO_2$ as these gases emerge from the membranes. As in the conventional hot carbonate process, the spent solution is reduced in pressure and pumped to a stripper 18 through which steam flows. $H_2S$ and $CO_2$ leave the solution in the stripper, and are carried away by the steam. The stripped solution is thereafter returned to the absorber.

FIG. 4 illustrates an assembly 20 of ILMs 21, 22, 23 and 24, and gas permeable barriers 25, 26, 27 and 28, employed in absorber 18 in the apparatus of FIG. 3. Each membrane comprises an immobilized carbonate/bicarbonate solution, approximately 4 mils thick. The feed gas mixture is applied to flow manifolds 30 and 31, while a hot carbonate solution is applied to flow manifolds 32, 33 and 34. Each ILM 21, 22, 23 and 24 is separated from the hot carbonate sweeping solution by a several mils thick, microporous, hydrophobic material 25, 26, 27 and 28, respectively. By employing this type of absorber construction, the absorber itself is made more compact, and hence less expensive, than a conventional packed tower even though the ILMs and gas permeable barriers are more expensive than an equivalent volume of packing.

Absorber construction of the type shown in FIG. 4 is more selective to $H_2S$ versus $CO_2$ than conventional absorber construction. In a conventional absorber, acid gases are absorbed in carbonate solution by reaction and diffusion in a relatively stagnant liquid boundary layer adjacent the gas phase. The membrane assembly absorber actually contains two boundary layers; that is, the membrane itelf constitutes one layer and the nearly stagnant carbonate liquid solution adjacent the gas permeable barrier constitutes the other. As pointed out in the aforementioned application Ser. No. 599,871, carbon dioxide flux through two layers of some predetermined total thickness separated by a gas permeable barrier is less than the carbon dioxide flux through a single layer of that same thickness, while hydrogen sulfide flux is the same in both instances. If the total effective boundary layer thickness of membrane assembly 20 used in absorber 18 of FIG. 3 is not substantially different from the effective boundary layer thickness in absorber 16 of FIG. 2, absorber 18 in FIG. 3 is substantially more selective to $H_2S$ versus $CO_2$ than absorber 16 of FIG. 2. Absorber 18 can be made even more selective to $H_2S$ by adding gas permeable barriers between membrane layers in the manner described in the aforementioned Ward application Ser. No. 599,871.

Ethanol amines are widely used for the treatment of natural, refinery, and synthesis gases which contain $H_2S$ and $CO_2$ as the only impurities to be removed. The large carrying capacity of ethanol amine solutions should make them desirable for use in $H_2S$ removal from gasified coal. They are not generally suitable for this purpose, however, since more $CO_2$ than $H_2S$ would be absorbed, decreasing the useful carrying capacity of the solution and increasing enormously the heat required to regenerate the solution. Moreover, other constituents of coal gas, such as COS, organic acids, and nitrogen bases react irreversibly with ethanol amines, resulting in unacceptably high makeup chemical costs, and complex solution purification systems.

FIG. 5 illustrates a new system of removing $H_2S$ from a feed gas mixture including $H_2S$ and $CO_2$, such as gasified coal, wherein an ethanol amine sweep solution is employed. The feed gas mixture is passed through a flow manifold 40 along an ILM 41 in intimate contact with, and supported by, a GORE-TEX microporous gas permeable barrier 42. The ethanol amine sweep solution is passed along gas permeable barrier 42 through a flow manifold 43.

Membrane 41 is an immobilized film of $CO_3^=/HCO_3^-$ solution, separated from the sweep liquid by gas permeable barrier 42. ILM 41 protects the amine solution from the chemically harmful constituents of gasified coal. COS is converted by membrane 41 to $CO_2$ and $H_2S$. Other trace materials in the coal gas are not permeable in the membrane. Since the membrane is selective for $H_2S$ against $CO_2$, the membrane minimizes $CO_2$ absorption in the sweep solution.

A desirable ethanol amine to use for the sweep solution is monoethanol amine because of its low price, high reactivity, and excellent stability. Diethanol amine is also useful. Employing conventional industrial practice, the $H_2S$ absorption takes place at approximately 80° F. When the solution has passed through the absorber, it is heated to 200°–230° F. and passed through a tower for $H_2S$ removal. Some steam is added, and steam and $H_2S$ leaving the stripper go to a condenser. The $H_2S$ leaving the condenser goes to a Claus plant.

An alternative stripping apparatus for regenerating the sweep liquid, illustrated in FIG. 6, is a multi-layer membrane assembly comprised of gas permeable barriers 51, 52 and 53 separating alternating hot amine-carrying and steam-carrying flow manifolds 54 and 55, 56 and 55, and 56 and 57, respectively. The gas permeable barrier comprises a microporous membrane layer such as GORE-TEX, which permits passage of $H_2S$ plus a small amount of $CO_2$ therethrough into a steam sweep fluid. The advantages of this type of stripper reside in both its small size and better steam utilization. This type of construction may also be employed in stripper 19 of FIG. 3, hot carbonate solution being substituted for the hot amine solution in the apparatus of FIG. 6.

Gasification of 60 tons/hr of coal containing 4.5% sulfur results in the following gas composition at 80° F. and 2 atmospheres pressure:

$CO_2$:105,000 lbs/hr
CO:60,000 lbs/hr
$H_2O$:7,000 lbs/hr
$CH_4$:9,000 lbs/hr
$N_2$:168,000 lbs/hr
$H_2S$:5,700 lbs/hr
$H_2O$:4,400 lbs/hr.

Except for the $H_2S$, the actual gas composition may differ somewhat from the foregoing. Nevertheless, for every 4 moles of $H_2S$ removed from this gas mixture, only one mole of $CO_2$ is removed. A monoethanol amine solution circulation rate of 200–300 grams per minute is required, and with a conventional stripper, net heat input of $14 \times 10^6$ Btu/hr is required. Somewhat better steam utilization in a membrane-type stripper might reduce the heat requirement 10%. Membrane area required for the absorber, assuming 2 atmospheres gas pressure, $$50{,}000 \times 10^{-9} \frac{cc\ (STP),\ cm.\ thickness}{sec,\ cm.^2,\ cm.\ Hg\ \Delta P}\ H_2S\ permeability,$$

90% $H_2S$ removal, and a 2 mil membrane, is 140,000 square feet. Relatively low power is required to run the process since the amine circulation rate is very low.

The foregoing describes a simplified method and apparatus for efficiently transferring hydrogen sulfide out of a mixture of gases including carbon dioxide, such as gasified coal. The hydrogen sulfide is removed by being absorbed in a liquid sweep.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. A method of selectively removing hydrogen sulfide from a mixture of gases including carbon dioxide, comprising:
    contacting an immobilized liquid membrane with said mixture to allow facilitated transport of hydrogen sulfide through said membrane to a porous gas-permeable barrier;
    passing gases emerging from said membrane through said gas-permeable barrier;
    absorbing in a sweep liquid the gases emerging from said gas-permeable barrier; and
    said sweep liquid comprising a liquid selected from a group consisting of a hot carbonate solution, a solution of redox agent which converts hydrogen sulfide to sulfur, and an ethanol amine solution.

2. The method of claim 1 including the step of regenerating said sweep liquid by contacting an additional porous gas permeable barrier with said sweep liquid and absorbing in a steam sweep the gases emerging from said additional porous gas permeable barrier.

3. The method of claim 1, wherein the sweep liquid is supplied at approximately the same pressure as the mixture of gases.